(12) United States Patent   (10) Patent No.: US 7,545,891 B1
Pare, Jr. et al.   (45) Date of Patent: Jun. 9, 2009

(54) CARRIER RECOVERY ARCHITECTURES FOR MULTI INPUT MULTI OUTPUT ORTHOGONAL FREQUENCY DIVISION MULTIPLEXING RECEIVERS

(75) Inventors: Thomas Edward Pare, Jr., Mountain View, CA (US); Chien-Cheng Tung, Fremont, CA (US)

(73) Assignee: Ralink Technology, Inc., Cupertino, CA (US)

( * ) Notice: Subject to any disclaimer, the term of this patent is extended or adjusted under 35 U.S.C. 154(b) by 645 days.

(21) Appl. No.: 11/074,921

(22) Filed: Mar. 7, 2005

Related U.S. Application Data

(63) Continuation-in-part of application No. 11/048,075, filed on Jan. 31, 2005, which is a continuation-in-part of application No. 10/797,299, filed on Mar. 9, 2004, now Pat. No. 7,245,677.

(51) Int. Cl.
*H04L 27/06* (2006.01)
(52) U.S. Cl. ..................................... 375/344
(58) Field of Classification Search ................. 375/344
See application file for complete search history.

(56) References Cited

U.S. PATENT DOCUMENTS

| | | | |
|---|---|---|---|
| 7,019,595 B1 | 3/2006 | Lo et al. | |
| 7,197,094 B2 | 3/2007 | Tung | |
| 7,245,677 B1 | 7/2007 | Pare, Jr. | |
| 7,248,650 B1 | 7/2007 | Tung et al. | |
| 7,266,146 B2 | 9/2007 | Pare, Jr. et al. | |
| 2003/0123582 A1* | 7/2003 | Kim et al. | ........ 375/347 |
| 2004/0120412 A1* | 6/2004 | Banerjea | ........ 375/260 |

* cited by examiner

*Primary Examiner*—Kevin Y Kim
(74) *Attorney, Agent, or Firm*—Maryam Imam

(57) ABSTRACT

A modem system for transmitting and receiving signals having a frequency domain equalizer (FEQ) being responsive to a plurality of received data symbols for processing the same to generate one or more equalized data symbols, said modem system being responsive to a plurality of received baseband signals for processing the same to generate said plurality of received data symbols, said plurality of received data symbols for including one or more sets of pilot tones, said FEQ for processing said sets of pilot tones to generate one or more sets of equalized sets of pilot tones, in accordance with an embodiment of the present invention. The modem system further includes a frequency offset detection module being responsive to said sets of equalized pilot tones to generate one or more instantaneous carrier offsets, said modem system for processing said instantaneous carrier offsets to generate one or more frequency corrections for applying the same to said plurality of received baseband signals to remove carrier offsets therefrom, wherein the flexible architecture of said modem system allows for removal of said carrier offsets to improve reception of said plurality of received baseband signals.

9 Claims, 5 Drawing Sheets

CARRIER RECOVERY ARCHITECTURES FOR MULTI INPUT MULTI OUTPUT ORTHOGONAL FREQUENCY DIVISION MULTIPLEXING RECEIVERS

CROSS REFERENCE TO RELATED APPLICATIONS

This application is a continuation-in-part of U.S. patent application Ser. No. 10/797,299 filed on Mar. 9, 2004 now U.S. Pat. No. 7,245,677, and entitled "AN EFFICIENT METHOD FOR MULTI-PATH RESISTANT CARRIER AND TIMING FREQUENCY OFFSET DETECTION" and a continuation-in-part of U.S. patent application Ser. No. 11/048,075, filed on Jan. 31, 2005, and entitled "Joint TIME/ FREQUENCY DOMAIN MAXIMUM RATIO COMBINING ARCHITECTURES FOR MULTI INPUT MULTI OUTPUT WIRELESS RECEIVERS" which are incorporated herein by reference as though set forth in full.

BACKGROUND OF THE INVENTION

1. Field of the Invention

The present invention relates generally to the field of multi input multi output modem systems and particularly to a method and apparatus for using a flexible architecture to correct carrier offsets in the received signals.

2. Description of the Prior Art

As computers have gained enormous popularity in recent decades, so have networking the same allowing for access of files by one computer from another. More recently and with the advent of wireless communication, remote and wireless networking of computers is gaining more and more notoriety among personal users, small and large business owners, factory facilities and the like.

With regard to the wireless networking of personal computers including laptops, a particular modem, namely modems adapted to the IEEE 802.11a or 802.11g industry standard, are commonly employed. That is, an antenna is placed inside or nearby the personal computer and an RF chip receives signal or data through the antenna and an analog-to-digital converter, typically located within the personal computer (PC), converts the received signal to baseband range. Thereafter, a baseband processor is employed to process and decode the received signal to the point of extracting raw data, which may be files transferred remotely and wireless, from another PC or similar equipment with the use of a transmitter within the transmitting PC.

There are several prior art apparatus and techniques for implementing 802.11a/g modem receivers, however, such prior art have not successfully utilized the fullest potential of the 802.11a/g modem. For example, the maximum rate of this type of modem device is 54 Mbits/sec, but in the presence of multi-path channel, use of current prior art methods and apparatus does not allow for reception of data at such rates. In fact, successful reception of data under multi-path channel conditions currently takes place at lower rates or may fail altogether.

To improve reception of data at higher rates multi input multi output orthogonal frequency division multiplexing (OFDM) transceivers having multiple antennae for transmitting and receiving OFDM-modulated data packets is often employed. In OFDM modulation with considerable sensitivity to carrier offsets, the quality of the received signals depends to a large extent on the orthogonality between the adjacent subcarriers. The presence of residual carrier offsets in the received baseband signals may result in inter-carrier interference (ICI) which quickly degrades signal quality. The presence of carrier offset is particularly critical for multi input multi output modem systems wherein decoupling of several data streams received by multiple receiver antennae is performed. If the carrier offset (or carrier frequency offset) is not completely removed from the independent received signals, insufficient decoupling of the data streams may result which further degrades the signal quality. Thus, it is desirable to develop a method and apparatus for multi antennae multi input multi output transceivers that offer improved performance over the conventional designs without incurring substantially higher costs.

SUMMARY OF THE INVENTION

Briefly, an embodiment of the present invention includes a modem system for transmitting and receiving signals having a frequency domain equalizer (FEQ) being responsive to a plurality of received data symbols for processing the same to generate one or more equalized data symbols, said modem system being responsive to a plurality of received baseband signals for processing the same to generate said plurality of received data symbols, said plurality of received data symbols for including one or more sets of pilot tones, said FEQ for processing said sets of pilot tones to generate one or more sets of equalized sets of pilot tones. The modem system further includes a frequency offset detection module being responsive to said sets of equalized pilot tones to generate one or more instantaneous carrier offsets, said modem system for processing said instantaneous carrier offsets to generate one or more frequency corrections for applying the same to said plurality of received baseband signals to remove carrier offsets therefrom, wherein the flexible architecture of said modem system allows for removal of said carrier offsets to improve reception of said plurality of received baseband signals.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Figure 1:
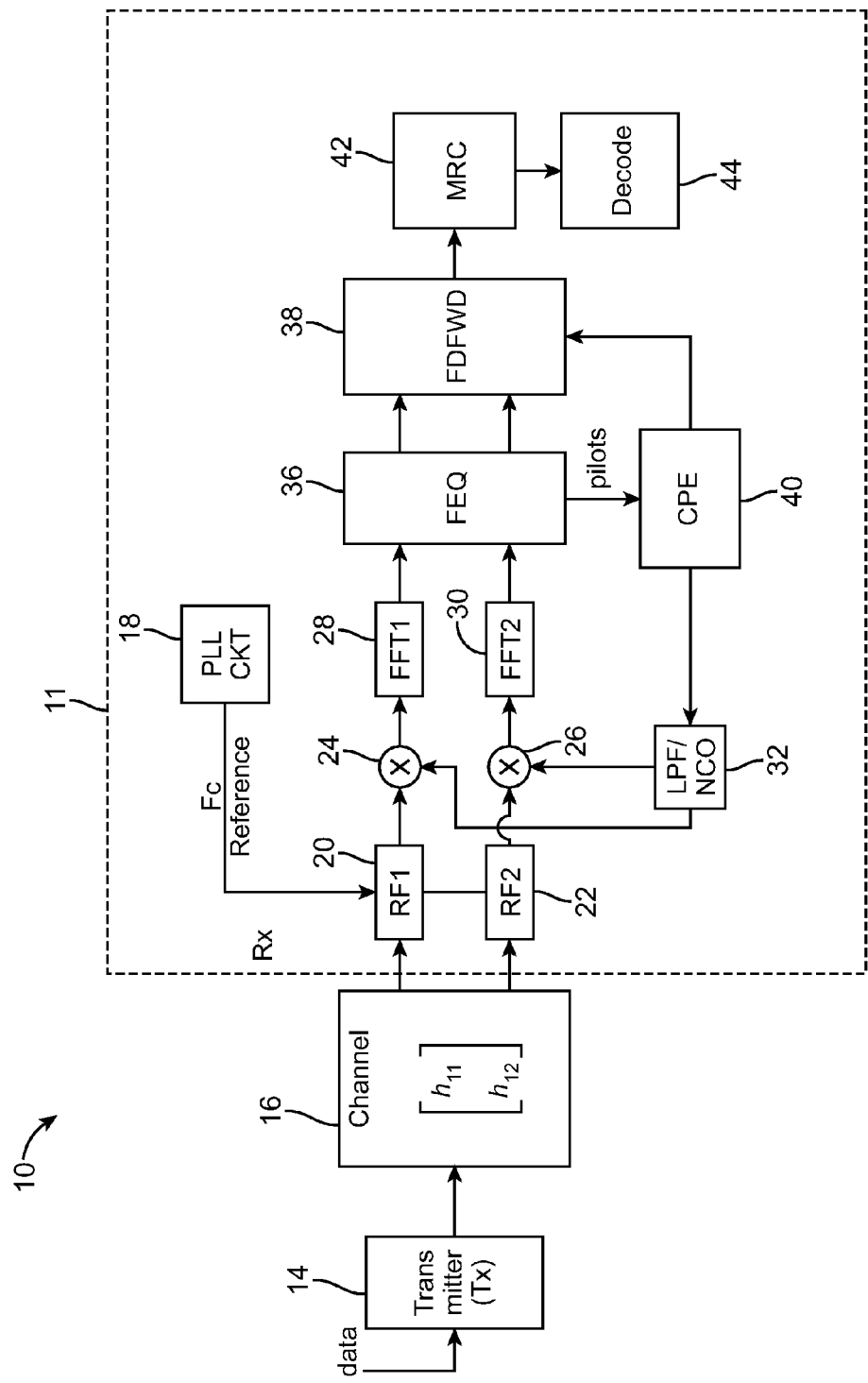
FIG. 1 shows the architecture for a multi input multi output (MIMO) (one input two output) modem system, in accordance with an embodiment of the present invention.

Referring now to FIG. 1, the architecture of a multi input multi output (MIMO) (one input two output) modem system 10 is shown, in accordance with an embodiment of the present invention. The modem system includes a transmitter 14 and a receiver circuit 11. The transmitter 14 sends a radio signal through the physical channel 16 to the receiver. The receiver circuit 11 includes two radio frequency (RF) modules 20 and 22, a phase-lock loop (PLL) circuit 18, two frequency shifters 24 and 26, two fast Fourier transform (FFT) analyzers 28 and 30, a frequency domain equalizer (FEQ) 36, a feedforward correction module 38, a frequency offset detection module 40, a maximum ratio combining (MRC) module 42, a decoder 44, and a low pass filter/numerical oscillator (LPF/NCO) module 32.

Transmitter 14 is coupled to the physical channel 16. The PLL circuit 18 is coupled to the RF modules 20 and 22. The RF module 20 is coupled to the frequency shifter 24 which is coupled to the FFT analyzer 28, while the RF module 22 is coupled to the frequency shifter 26 which is coupled to FFT analyzer 30. Both FFT analyzers 28 and 30 are coupled to the FEQ 36 which is coupled to the feedforward correction module 38. The feedforward correction module 38 is coupled to the MRC module 42 which is coupled to the decoder 44. The FEQ 36 is coupled to the frequency offset detection module 40 which is coupled to the feedforward correction module 38 and the LPF/NCO module 32. The LPF/NCO module 32 is coupled to the frequency shifters 24 and 26.

Data comprising signals to be transmitted are sent by the transmitter 14 to the physical channel 16. The physical channel 16 processes the transmitter output to generate two data streams that are transmitted to the RF modules 20 and 22. The RF module 20 receives a first received signal and the RF module 22 receives a second received signal.

A single PLL circuit 18 generates a common reference RF source that is used for de-mixing the two received signals to generate two received data paths. The RF module 20 generates a first received baseband signal and the RF module 22 generates a second received baseband signal. In another embodiment of the present invention two separate PLL circuits are employed to generate two common reference RF sources to be used in the two RF modules 20 and 22.

The modem system 10 is a single input multi output orthogonal frequency division multiplexing (OFDM) transceiver for transmitting and receiving OFDM-modulated data packets. In OFDM modulation with considerable sensitivity to carrier offsets, the quality of the received signals depends to a large extent on the orthogonality between the adjacent subcarriers. The presence of residual carrier offsets in the received baseband signals may result in inter-carrier interference (ICI) which quickly degrades signal quality. The presence of carrier offset is particularly critical for multi input multi output modem systems wherein decoupling of several data streams received by multiple receiver antennae is performed. If the carrier offset (or carrier frequency offset) is not completely removed from the independent received signals, insufficient decoupling of the data streams may result which further degrades the signal quality.

The architecture of the modem system 10 with one transmitter and two receivers ensures nearly optimal carrier recovery across the two receiver channels. Carrier offset recovery is performed using a single set of pilot tones for the two independent received baseband signals, shown in FIG. 1. That is, two independent baseband carrier recovery circuits are used resulting in a simplified architecture of the modem system 10, as described in detail hereinbelow.

Transmitter 14 sends a single set of pilot tones θ per every transmitted data symbol, as discussed in detail in the U.S. patent application Ser. No. 10/797,299, entitled "AN EFFICIENT METHOD FOR MULTI-PATH RESISTANT CARRIER AND TIMING FREQUENCY OFFSET DETEC-TION", filed on Mar. 9, 2004, the disclosure of which is herein incorporated by reference in its entirety. The design of the modem system 10 having one transmitter and two receivers (1T2R) is simplified by using the single set of pilot tones θ in the receiver circuit 11 comprising two baseband carrier recovery circuits.

The modem system 10 uses the set of pilot tones θ, which, for 802.11a/g modems, includes four pilot tones $\theta_1, \ldots, \theta_4$. The pilot tones are estimated by the modem system 10 and used to make appropriate corrections to the signal in the receiver circuit 11. In an alternative embodiment of the present invention, the set of pilot tone θ includes 8 or more pilot tones.

The pilot tones are sent from the transmitter 14, through two separate transmitter antennae, to the physical channel 16 wherein two data streams are generated. In the frequency domain, the physical channel 16 forms the product of the channel vector $$\begin{bmatrix} h_i^1 \\ h_i^2 \end{bmatrix}$$

with the pilot tones θ. Thus, for example, on the $i^{th}$ tone, the first data stream includes $h_i^1 \theta_i$ while the second data stream includes $h_i^2 \theta_i$, i=1, ..., 4. So, that at the receiver, the pair of pilot tones (or, simply, the $i^{th}$ pilot tone vector having two components) received may be expressed as:

$$\phi_i = \begin{bmatrix} h_i^1 \\ h_i^2 \end{bmatrix} \theta_i.$$

The receiver circuit 11 uses the set of pilot tone vectors as a measurement of the specific angles of rotation or phases caused by the carrier offset.

The receiver circuit 11 receives two received signals. In particular, the RF module 20 receives a first received signal for converting the same into a first received baseband signal and the RF module 22 receives a second received signal for converting the same into a second received baseband signal.

In the modem system 10, presence of only one set of pilot tones θ allows the two received baseband signals to be combined into a single signal and processed by a single independent carrier recovery circuit in the receiver circuit 11, as discussed in detail hereinbelow.

The frequency shifters 24 and 26 apply frequency corrections to the received baseband signals to remove carrier offsets therefrom. The frequency shifters 24 and 26 generate two adjusted signals.

Each of the FFT analyzers 28 and 30 performs a 64-point fast Fourier transformation to convert the 64 time domain samples into 64 frequency domain subcarriers constituting one received data symbol. Accordingly, the FEQ 36 receives two received data symbols from the FFT analyzers 28 and 30.

In one embodiment of the present invention, the FEQ 36 utilizes the estimated channel coefficients, represented by $$\hat{H}^1 = \begin{bmatrix} \hat{h}_1 \\ \hat{h}_2 \\ \hat{h}_3 \\ \hat{h}_4 \end{bmatrix}^1, \hat{H}^2 = \begin{bmatrix} \hat{h}_1 \\ \hat{h}_2 \\ \hat{h}_3 \\ \hat{h}_4 \end{bmatrix}^2,$$

for processing the two received data symbols to generate two equalized data symbols. Each of the equalized data symbols includes a set of equalized pilot tones which are used to provide a good measure of carrier offset. The equalized pilot tones are determined by multiplying the inverted estimated channel coefficients with the received data symbols. The estimated channel coefficients are calculated using the FEQ training information.

In an alternative embodiment of the present invention, as discussed in U.S. patent application Ser. No. 11/048,075, entitled "Joint TIME/FREQUENCY DOMAIN MAXIMUM RATIO COMBINING ARCHITECTURES FOR MULTI INPUT MULTI OUTPUT WIRELESS RECEIVERS", filed on Jan. 31, 2005, the disclosure of which is herein incorporated by reference in its entirety, the estimated channel coefficients are used to form an optimal combiner for the $i^{th}$ pilot tone vector according to:

$$F_i = \frac{H_i^*}{|H_i^*|^2} = \frac{1}{\left(\left|\hat{h}_i^1\right|^2 + \left|\hat{h}_i^2\right|^2\right)} \left[\hat{h}_i^{1*} \hat{h}_i^{1*}\right].$$

The FEQ 36 stores the set of four combiner vectors $F_i$, i=1, ..., 4, and uses $F_i$ to combine the two outputs from the FFT analyzers 28 and 30 to generate a set of equalized pilot symbols which are then used to provide a good measure of carrier offset. In particular, the equalized pilot tones may be found by performing the multiplication of the combiners $F_i$, i=1, ..., 4 with the pilot tone vectors:

$$\hat{\theta}_i = F_i \phi_i,$$

for each i=1, ..., 4.

The equalized pilot tones are used by the frequency offset detection module 40 to generate an instantaneous carrier offset expressed as $$\hat{\Theta} = \sum_{i=1}^{4} \beta_i \hat{\theta}_i$$

wherein a set of weights $\beta_i$ is used to weight the equalized pilot tones based on the noise level therein. The instantaneous carrier offset is also referred to as the common phase error (CPE); computation of the CPE and the derivation of the weights $\beta_i$ are discussed in detail in the U.S. patent application mentioned hereinabove. In this case, the weights $\beta_i$, i=1, ..., 4, are computed using the summed magnitude quantities: $(|\hat{h}_i^1|^2 + |\hat{h}_i^2|^2)$, i=1, ..., 4, as further discussed in the patent application "Joint TIME/FREQUENCY DOMAIN MAXIMUM RATIO COMBINING ARCHITECTURES FOR MULTI-INPUT MULTI-OUTPUT WIRELESS RECEIVERS", filed on Jan. 31, 2005. The instantaneous carrier offset in the equation hereinabove is a single scalar quantity, and is determined using the combination of two sets of pilot tones from the corresponding receiver channels. However, such a procedure may be extended to receiver circuits having three or more receiver channels.

The instantaneous carrier offset $\hat{\Theta}$ is transferred to the LPF/NCO module 32 wherein a single frequency correction is generated. The frequency correction is used in the frequency shifters 24 and 26 to remove carrier offsets from the received signals.

The instantaneous carrier offset is also transferred to the feedforward correction module 38 to correct the effect of spurious noise on the equalized data symbols. The instantaneous carrier offset is used to correct the output of the FEQ 36 and an MRC algorithm is used to optimally combine the outputs of the two FFT analyzers 28 and 30, as described in the U.S. patent application mentioned hereinabove. The corrected symbols are transferred to the MRC module 42 to be combined using maximum ratio combining techniques. The combined corrected symbols as output of the MRC module 42 are transferred to the decoder 44 for subsequent decoding. In an alternative embodiment of the present invention a technique other than maximum ratio combining is used to combine the corrected symbols.

Figure 2:
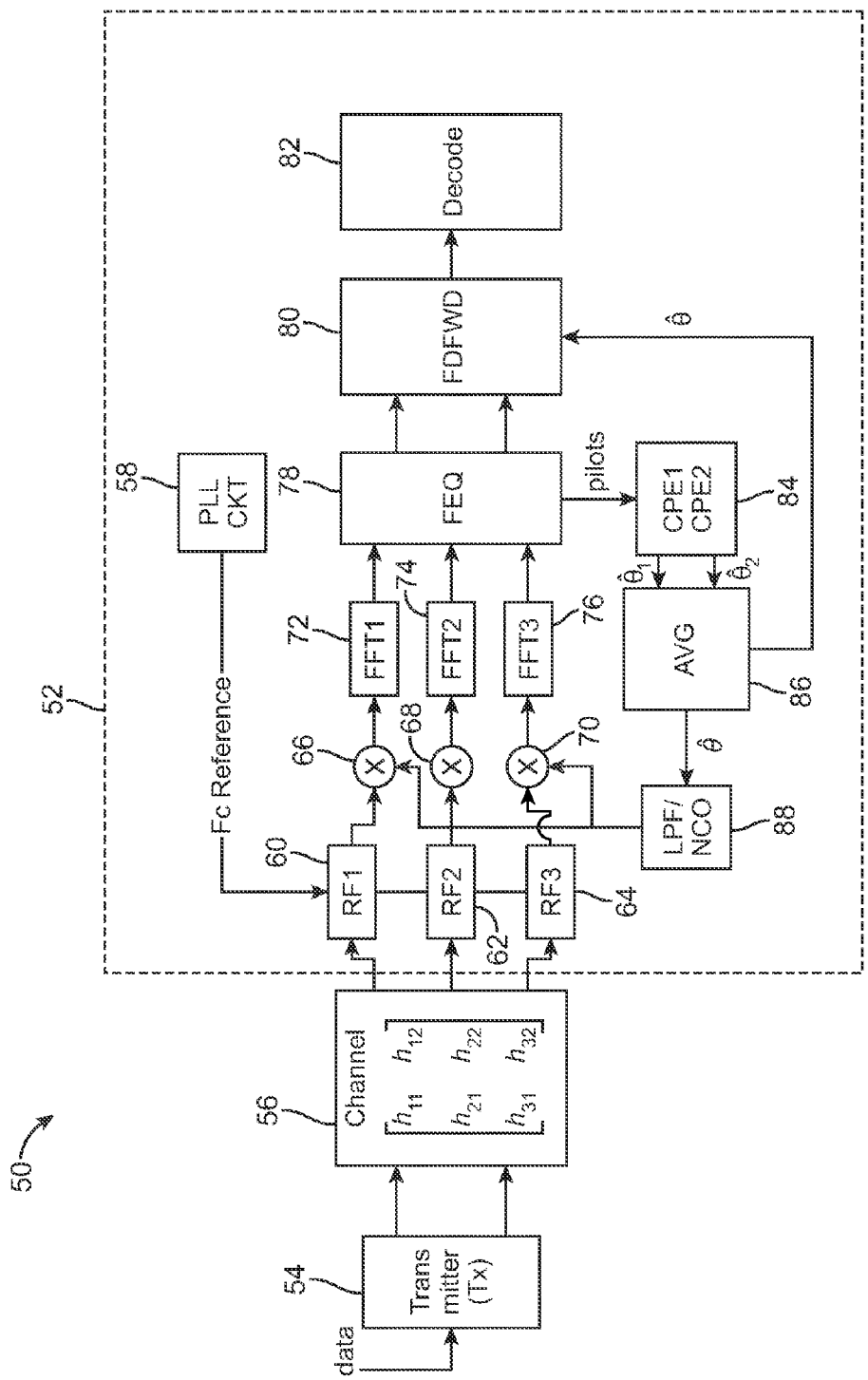
FIG. 2 shows the architecture for a MIMO (two input three output) modem system, in accordance with an embodiment of the present invention.

Referring now to FIG. 2, the architecture for a multi-input multi-output (MIMO) (two-input three-output) modem system 50 is shown to include a transmitter 54, a physical channel 56, and a receiver circuit 52, in accordance with an embodiment of the present invention. The receiver circuit 52 includes a PLL circuit 58, three RF modules 60-64, three frequency shifters 66-70, three FFT analyzers 72-78, an FEQ 78, a feedforward correction module 80, a decoder 82, a frequency offset detection module 86, an averaging (AVG) module 86, and a LPF/NCO module 88.

The transmitter 54 is coupled to the physical channel 56. The PLL circuit 58 is coupled to the three RF modules 60-64 which are coupled to the frequency shifters 66-70, respectively. The frequency shifters 66-70 are coupled to the FFT analyzers 72-76, respectively, which are coupled to the FEQ 78. The FEQ 78 is coupled to the frequency offset detection module 80 which is coupled to the decoder 82. The frequency offset detection module 84 is coupled to the averaging module 86 which is coupled to the feedforward correction module 80 and the LPF/NCO module 88 which is coupled to the frequency shifters 66-70.

In the modem system 50 two sets of signals to be transmitted are sent by the transmitter 54 through the physical channel (or medium) 56 where the signals are mixed together to generate three data streams. Each data stream includes a set of pilot tones. The receiver circuit 52 receives the three received signals using different antennae wherein individual pilot tones are extracted from the three received signals. The pilot tones are used to determine the individual carrier offsets of the separate RF modules 60-64. Accordingly, individual carrier offsets of the receiver circuit 52 are corrected independently to avoid performance loss due to ICI and RF instability.

Further, the modem system 50 allows enhanced data rates without requiring an increase in the bandwidth. For example, in a single input single output (SISO) modem system a typical data rate is about 20 megabits/second (mb/sec) whereas in the modem system 50 data rates of approximately 60 mb/sec may be achieved without using any more bandwidth than in the SISO case. Increased data rate enables a user to perform several tasks simultaneously such as maintaining a direct service line (DSL) connection, downloading a digital video disk (DVD) movie, etc.

MIMO transmitter/receiver systems can effectively achieve high throughput because the physical channel 56 provides diversity by allowing the two transmitted signals to travel on different paths to the three separate receiver antennae. The three received signals are decoupled in the receiver circuit 52 to generate two separate data symbols. In this way the channel provides two simultaneous data channel, and thus allows the modem system 50 to achieve data rates as much as twice that of single antenna systems.

In a wireless local area network (LAN) where the receiver circuit 52 is located on a single circuit board, use of a single PLL circuit 58 to drive each of the RF modules 60-64 enhances the performance of the modem system 50. Using a single PLL circuit is advantageous since having independent sources or PLL circuits may cause different drifts resulting in different transients in each of the RF modules 60-64.

Two independent sets of pilot tones $\theta_1$ and $\theta_2$ are included in the two sets of signals. The pilot tones are represented by $$\Theta^i = \begin{bmatrix} \theta_1 \\ \theta_2 \end{bmatrix}^i,$$

where the superscript i=1, . . . , 4, refers to the pilot number.

The two signals are mixed in the physical channel 56 using a 3×2 channel matrix expressed as $$H = \begin{bmatrix} h_{11} & h_{12} \\ h_{21} & h_{22} \\ h_{31} & h_{32} \end{bmatrix}.$$

Transmission of the three data streams via the physical channel 56 results in three outputs that are sensed at the receiver circuit 52 wherein three received signals are processed by the RF circuits 60-64. The three received signals in a matrix form may be expressed as a pilot tone vector having three components according to $$\Phi^i = H\Theta^i = \begin{bmatrix} h_{11} & h_{12} \\ h_{21} & h_{22} \\ h_{31} & h_{32} \end{bmatrix} \begin{bmatrix} \theta_1 \\ \theta_2 \end{bmatrix}^i = \begin{bmatrix} h_{11}\theta_1 + h_{12}\theta_2 \\ h_{21}\theta_1 + h_{22}\theta_2 \\ h_{31}\theta_1 + h_{32}\theta_2 \end{bmatrix}.$$

A single PLL circuit 58 generates a common reference source that is used for de-mixing the three received signals to generate three received baseband signals which are transferred to the frequency shifters 66-70. In the frequency shifters 66-70, frequency corrections are applied to the received baseband signals to remove carrier offsets therefrom. The frequency shifters 66-70 generate three adjusted signals that are received by the FFT analyzers 72-76, respectively.

The FFT analyzers 72-76 generate three received data symbols each of which for including 64 frequency domain subcarriers. The FEQ 78 applies estimated channel coefficients to the three received data symbols to generate two sets of equalized data symbols corresponding to the two originally transmitted data streams.

In one embodiment, the FEQ 78 performs a QR decomposition in order to effectively invert the channel matrix. For example, the channel matrix $H \in C^{3 \times 2}$ is written as $$H = QR,$$

where R is upper triangular (for easy inversion via back substitution) and Q is a unitary matrix (with all the eigenvalues having unit absolute value and the property Q*Q=I). Accordingly, the pseudo-inverse of the channel matrix is expressed as $$H^{-1} = R^{-1}Q^*.$$

In an alternative embodiment of the present invention a different matrix inversion technique such as singular value decomposition is used, or for a square system such as a 2×2 or 3×3 system, a true matrix inverse might be used.

The FEQ 78 uses the inverse of a distribution matrix whose elements are the estimated channel coefficients to generate the equalized data symbols. The estimated channel coefficients are calculated using the FEQ training information. The equalized data symbols include equalized pilot tones' which are computed in the FEQ 78 according to $$\hat{\Theta}^i = \hat{H}^{-1}\Phi^i = \hat{H}^{-1}H\Theta^i$$

$$\cong \Theta^i$$

It is noted that if channel estimation is perfect and there is no noise in the received signals, then there is perfect estimation, i.e. $\hat{\Theta}^i = \Theta^i$. It is seen, therefore, that the equalized pilot tones provide a good estimate of the frequency offset.

The equalized pilot subcarriers are used by the frequency offset detection module 84 to generate two instantaneous carrier offsets represented by the two components of the vector $$\hat{\Theta} = \sum_{i=1}^{4} \beta^i \hat{\Theta}^i$$

where $\beta^i$ are the weights discussed hereinabove. In this case, however, the constituents ($\hat{\Theta}^i$) are pilot vectors, with two elements. The weights ($\beta^i$) associated with the pilot vectors can be computed using a scalar metric based on the matrix. For example, if the matrix H is square (2×2, or 3×3) then the determinant of the matrix may be used as the metric. The determinant d of a 2×2 matrix $$H = \begin{bmatrix} h_{11} & h_{12} \\ h_{21} & h_{22} \end{bmatrix},$$

is given as $d = h_{11}h_{22} - h_{12}h_{21}$. In this case the weights may be defined as:

$$\beta_i = \frac{d_i}{\sum_{j=1}^{4} (d_j)^2}.$$

In an alternative embodiment of the present invention other matrix norms such as the condition number (ratio of maximum/minimum singular values) for non-square matrices is used to determine the weights associated with the pilot vectors.

The instantaneous carrier offset $\hat{\Theta}$ is a two-component vector. Since the architecture in FIG. 2 assumes a common carrier frequency reference 58, the two components of the vector may be combined to generate a scalar averaged carrier offset:

$$\hat{\theta} = \frac{1}{2}\sum_{i=1}^{2}\hat{\Theta}_i,$$

as depicted in the averaging (AVG) module 86. The averaged carrier offset $\hat{\theta}$ is sent to the LPF/NCO module 88 wherein a frequency correction is generated which is supplied to the frequency shifters 66-70, to correct the frequency offset of the received signals.

In addition, the averaged carrier offset value $\hat{\theta}$ is sent to the feedforward module 80 to be used therein to correct the equalized data symbols from the FEQ 78 to generate corrected symbols. The corrected symbols are subsequently decoded in the decoder 82.

Figure 4:
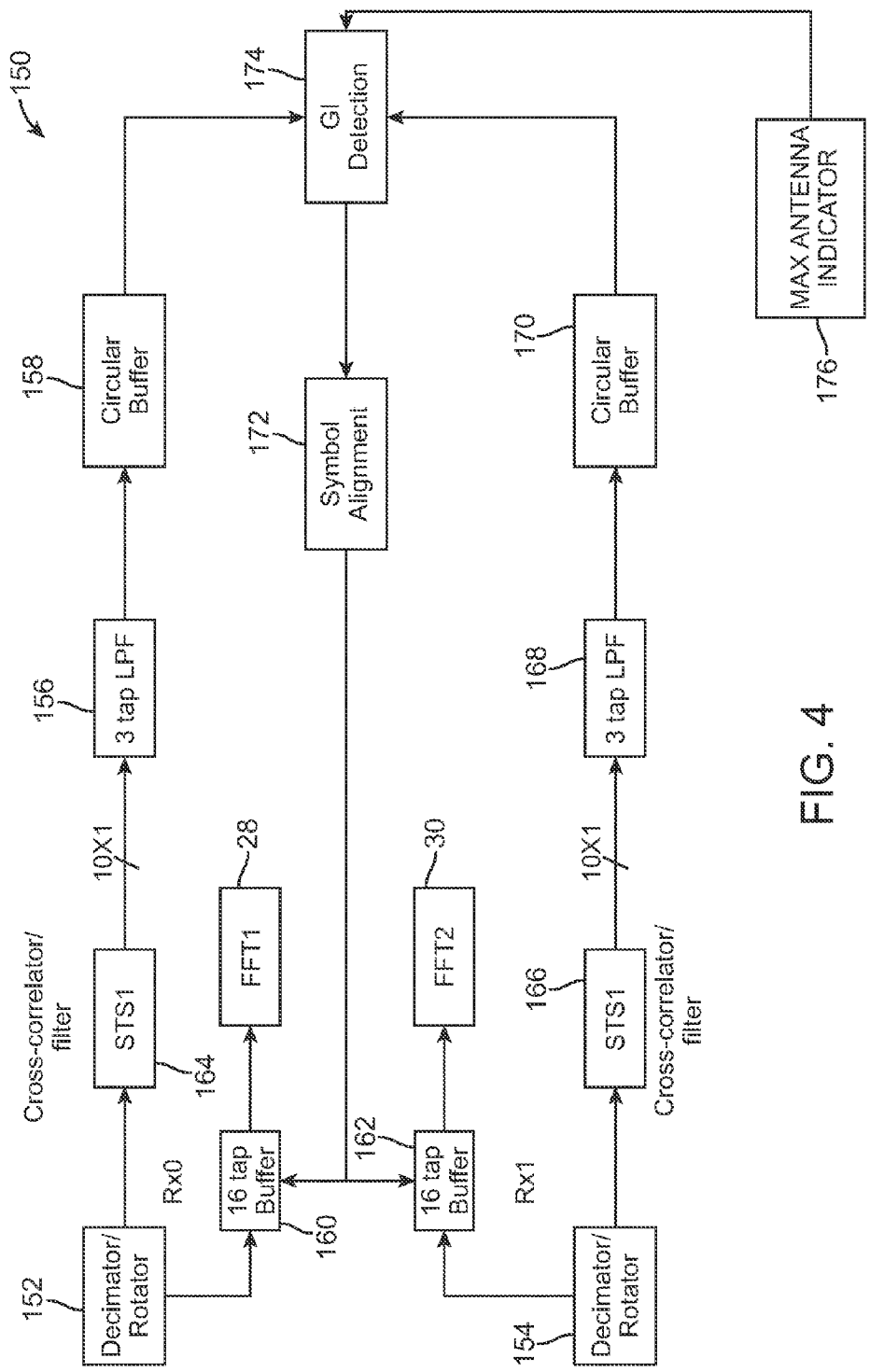
FIG. 4 shows a block diagram for a synchronization (SYNC) module for the 1-transmitter 2-receiver modem system, in accordance with an embodiment of the present invention.
Figure 5:
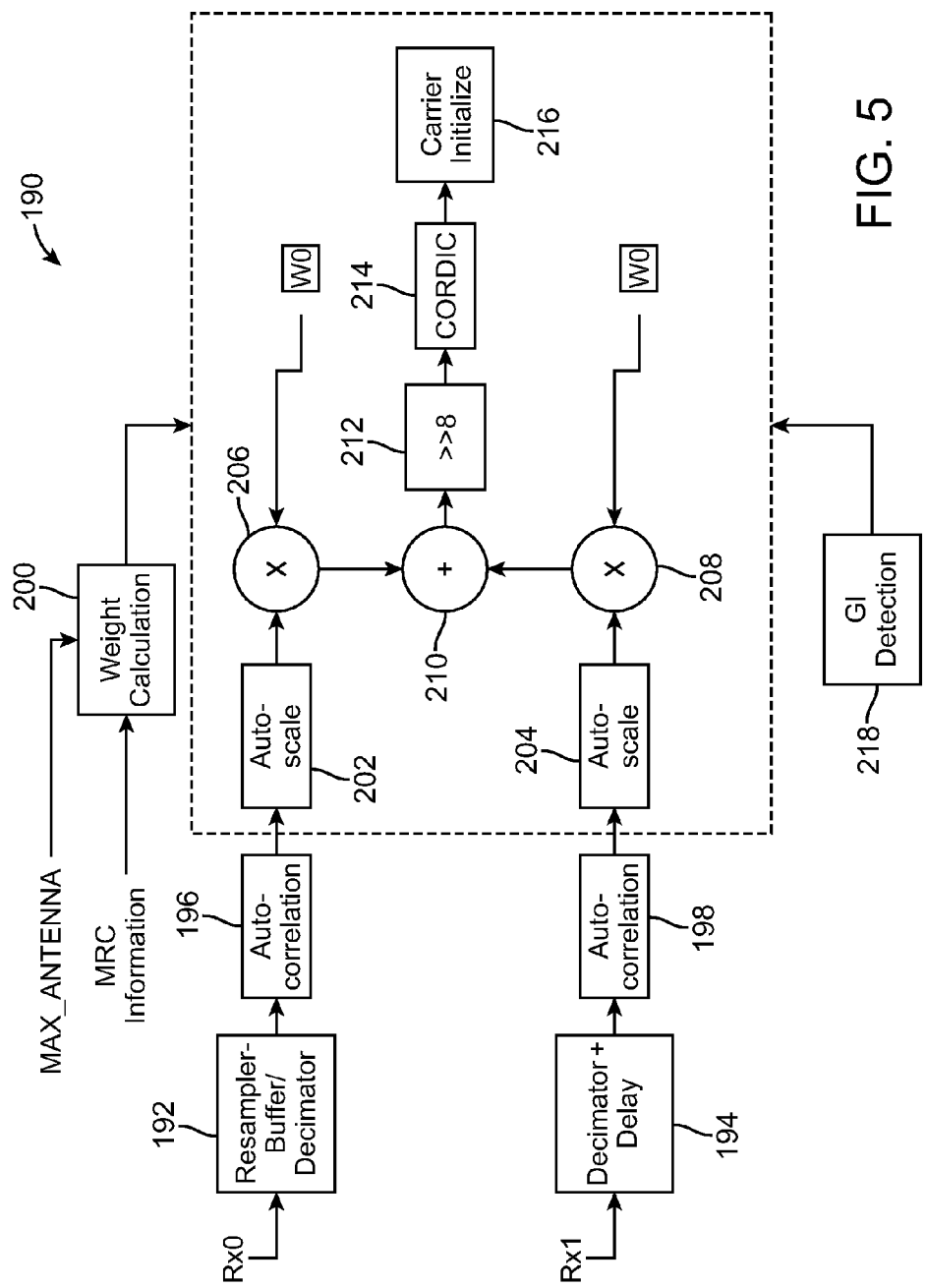
FIG. 5 shows a block diagram of an MIMO carrier offset initialization module, in accordance with an embodiment of the present invention.

The modem system 50 shown in FIG. 2 includes a processor (not shown), or computer medium, some type of storage area and a computer readable medium, for storing the software/firmware described in FIGS. 2, 4 and 5. The processor executes codes from the computer readable medium for effectuating the functions outlined in FIGS. 2, 4, and 5.

Figure 3:
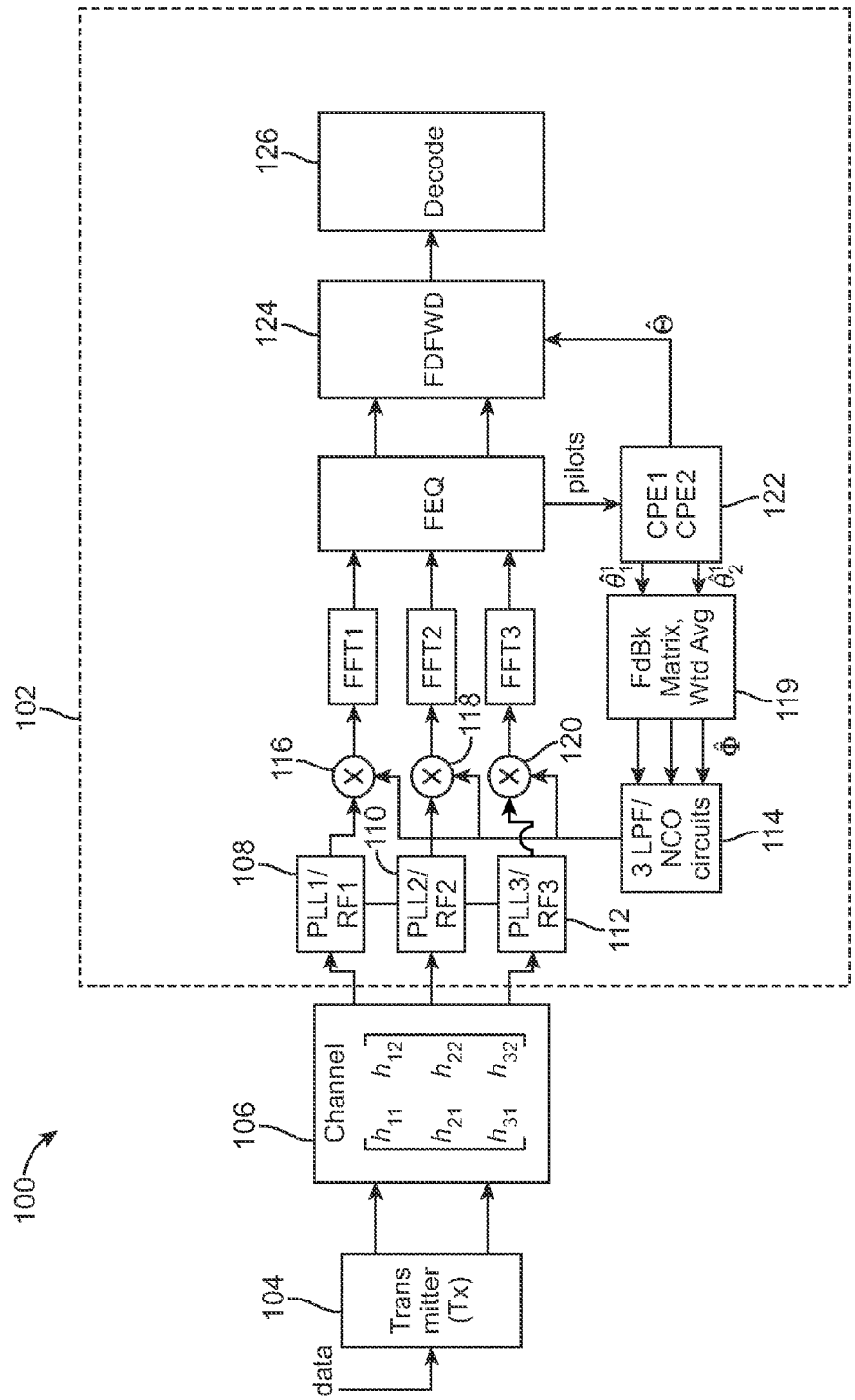
FIG. 3 shows the architecture for a two input three output MIMO modem system with three independent phase-lock loop (PLL) circuits, in accordance with an embodiment of the present invention.

Referring now to FIG. 3, the architecture for a two input three output MIMO modem system 100 having three independent PLL circuits is shown, in accordance with an embodiment of the present invention. The modem system 100 includes a transmitter 104, a physical channel 106, and a receiver circuit 102. The receiver circuit 102 includes three PLL/RF modules 108-112, three frequency shifters 116-120, a feedback matrix module 119, a LPF/NCO module 114, a feedforward correction module 124, a decoder 126, and a frequency offset detection module 122.

The transmitter 104 is coupled to the physical channel 106. The three PLL/RF modules 108-112 are coupled to the three frequency shifters 116-120, respectively. The feedback matrix module 119 is coupled to the LPF/NCO module 114 which is coupled to the three frequency shifters 116-120. The frequency offset detection module 122 is coupled to the feedforward correction module 124 and the feedback matrix module 119.

The operation of the modem system 100 is in some respects similar to the modem system 50. However, in the modem system 100 there are three independent RF circuits that are driven by three independent PLL circuits located in the PLL/RF modules 108-112. Accordingly, three independent LPF/NCO circuits located within the LPF/NCO module 114 are used to correct three independent frequency offsets in the RF circuits. This is particularly advantageous in the MIMO modem systems requiring physical separation of the receiving antennae with independent RF circuits. Independent RF circuits having independent PLL sources require individual frequency offset compensation which is provided by the three LPF/NCO circuits in the LPF/NCO module 114.

Specifically, two sets of signals are transferred from the transmitter 104 to the physical channel 106 wherein the signals are mixed together to generate three data streams. The three data streams are transmitted to the receiving circuits 102 wherein three received signals are processed by the PLL/RF modules 108-112 to generate three received baseband signals. Thereafter, the three received baseband signals are processed by the receiver circuit 102 in a manner similar to what was discussed hereinabove in relation to FIG. 2.

However, the weighted carrier offset generated by the feedback matrix module 119 is a 3-component vector. Each of the components is transferred to a separate LPF/NCO circuit located in the LPF/NCO module 114 wherein three independent frequency corrections are generated. This is in contrast to the receiver circuit 52 wherein the weighted carrier offset may be reduced to a single measure value by averaging the three components of the vector. Each of the independent frequency corrections is transferred to a separate frequency shifter 116, 118, or 120 to correct the frequency offset of the RF circuits with independent PLL circuits.

To apply frequency offset correction to the frequency shifters 116-120, the feedback matrix module 119 is used to convert the feedback signal that includes the instantaneous carrier offsets from CPE coordinates to RF coordinates thereby allowing the frequency corrections to be applied to the output of the individual PLL/RF modules 108-112. To this end, a distribution matrix is applied to the instantaneous carrier offsets in the feedback matrix module 119 to generate an estimated carrier offset having three components for the $i^{th}$ pilot tone according to $$\hat{\Phi}^i = \hat{H}^i\hat{\Theta}^i = \begin{bmatrix} \hat{h}_{11} & \hat{h}_{12} \\ \hat{h}_{21} & \hat{h}_{22} \\ \hat{h}_{31} & \hat{h}_{32} \end{bmatrix}^i \begin{bmatrix} \hat{\theta}_1 \\ \hat{\theta}_2 \end{bmatrix}^i = \begin{bmatrix} \hat{h}_{11}\hat{\theta}_1 + \hat{h}_{12}\hat{\theta}_2 \\ \hat{h}_{21}\hat{\theta}_1 + \hat{h}_{22}\hat{\theta}_2 \\ \hat{h}_{31}\hat{\theta}_1 + \hat{h}_{32}\hat{\theta}_3 \end{bmatrix}.$$

The feedback matrix module 119 computes a weighted carrier offset, in RF coordinates, according to $$\hat{\Phi} = \sum_{i=1}^{4}\alpha^i\hat{\Phi}^i$$

The carrier weights $\alpha^i$ are used to weight the estimated carrier offset based on the noise level in the $i^{th}$ pilot tone. The same procedure used for computing the weights $\beta^i$, as discussed hereinabove, may be used to determine $\alpha^i$. As a result, the effect of faded pilot tones are de-emphasized, as discussed in the U.S. Patent Application mentioned hereinabove.

The weighted carrier offset $\hat{\Phi}$ is a three-component vector, each component thereof being included in an input to a separate LPF/NCO circuit in the LPF/NCO module 114 to generate a frequency correction. Each of the three frequency corrections is transferred to a separate frequency shifter 116, 118 or 120 to remove carrier offsets from the received baseband signals. Accordingly, frequency correction is applied as a feedback signal for correcting carrier offsets in the receiver circuit 102.

In addition, the instantaneous carrier offsets $\hat{\Theta}^i$ are used to generate a feedforward correction vector to be used in the feedforward correction module 124 to correct the effects of spurious noise on the equalized data symbols, as similarly described hereinabove with respect to the modem system shown in FIG. 2. In particular, the frequency offset detection module 122 combines the individual pilot tone vectors using the same set of weights $\alpha^i$, to produce a combined feedforward correction vector according to the formula:

$$\hat{\Theta} = \sum_{i=1}^{4} a^i \hat{\Theta}^i.$$

The feedforward correction module 124 generates corrected symbols that are transferred to the decoder 126 for subsequent decoding.

The modem system 100 is advantageous in circumstances where the receiving antennae require physical separation such as in fixed wireless applications (WiMax or IEEE 802.16). Moreover, the modem system 100 100 achieves high levels of performance where physical separation between the transmitter 104 and the receiver circuit 102 is substantial.

In the foregoing a flexible baseband architecture was described that allows three different RF architectures to provide robust carrier offset discrimination and compensation. What follows hereinbelow is one implementation of a method for initializing the modem systems described hereinabove, upon the receipt of a new data packet of the received signal. For example, for effective functioning of the modem systems, the received signals must first be aligned in time, and the initial carrier offset must be acquired. One embodiment of such initialization functions is described hereinbelow, in conjunction with FIGS. 4 and 5.

Referring now to FIG. 4, a block diagram for a synchronization (SYNC) module 150 for the 1-transmitter 2-receiver (1T2R) modem system 10 is shown to include two decimator/rotator modules 152 and 154, two cross correlator modules 164 and 166, two 3-tap low pass filters (LPF) 156 and 168, two circular buffers 158 and 170, a guard interval (GI) detection module 174, a symbol alignment module 172, a maximum antenna indicator 176, two 16-tap buffers 160 and 162, and two FFT analyzers 28 and 30, in accordance with an embodiment of the present invention.

The decimator/rotator module 152 is coupled to the 16-tap buffer 160 and the cross correlator module 164 which is coupled to the 3-tap LPF 156 which is coupled to the circular buffer 158. The decimator/rotator module 154 is coupled to the 16-tap buffer 162 and the cross correlator module 166 which is coupled to the 3-tap LPF 168 which is coupled to the circular buffer 170. The two circular buffers 158 and 170 and the maximum antenna indicator 176 are coupled to the GI detection module 174 which is coupled to the symbol alignment module 174 which is coupled to the two 16-tap buffers 160 and 162. The 16-tap buffer 160 is coupled to the FFT analyzer 28 while the 16-tap buffer 162 is coupled to the FFT analyzer 30.

The SYNC module 150 is used for GI detection and symbol alignment between the two received baseband signals, as described in detail hereinbelow.

The two received baseband signals are cross-correlated with pre-stored short preamble sequences (SIS1) in the cross correlator modules 164 and 166 to determine two real valued outputs. The two real valued outputs are filtered using the 3-tap LPF's 156 and 168 and the outputs therefrom are transferred to the circular buffers 158 and 170, respectively.

The circular buffers 158 and 170 generate two channel outputs. The GI detection module 174 performs guard interval detection on the two channel outputs using the maximum antenna parameter, as determined by the automatic gain control (AGC) process, by comparing the received signal strength indicator (RSSI) settings between the two channel outputs. The GI threshold algorithm is similar to the algorithm used in the conventional 802.11g modem systems.

Upon completion of GI detection, the two channel outputs are aligned in the symbol alignment module 172 using the peak locations in the circular buffers 158 and 170 to calculate the relative offset between the two received baseband signals. The relative peak locations are received after the $64^{th}$ sample is processed in the SYNC module 150. Thus, a peak location is established for each channel output.

Referring now to FIG. 5, a block diagram of an MIMO carrier offset initialization module 190 is shown to include two decimators 192 and 194, two auto-correlation modules 196 and 198, a weight calculation module 200, a GI detection module 218, and a frequency offset module 220, in accordance with an embodiment of the present invention. The frequency offset module 220 includes two auto-scale modules 202 and 204, two multipliers 206 and 208, a summation junction 210, a divider 212, a Coordinate Rotation Digital Computer (CORDIC) 214, and a carrier initialization module 216.

The two decimators 192 and 194 are coupled to the two auto-correlation modules 196 and 198 which are coupled to the auto-scale modules 202 and 204, respectively. The auto-scale modules 202 and 204 are coupled to the multipliers 206 and 208, respectively, which are coupled to the summation junction 210 which is coupled to the divider 212. The divider 212 is coupled to the CORDIC 214 which is coupled to the carrier initialization module 216. The GI detection module 218 and the weight calculation module 200 are coupled to the frequency offset module 220.

Detection of the guard interval by the GI detection module 218 is followed by auto-correlation of the received baseband signals at the auto-correlation modules 196 and 198 to generate two auto-correlated outputs. The auto-correlated outputs are auto-scaled to 10 bits and weighted using the weights $W_0$ and $W_1$ to generate two weighted outputs. The weights $W_0$ and $W_1$ are determined based on the MRC weights using a look-up table approach. The weighted outputs are summed at the summation junction 210 and divided by 256 at the divider module 212 to generate a weighted correlation output which is processed by the CORDIC 214 to generate two independent carrier offset values.

The two independent carrier offset values are the initial carrier offset values used by the carrier initialization module 216 to start the NCO operation. The NCO operation activates the two frequency shifters 24 and 26 to correct the frequency offset prior to the start of the preamble portion of the received signals.

Although the present invention has been described in terms of specific embodiment, it is anticipated that alterations and modifications thereof will no doubt become apparent to those more skilled in the art. It is therefore intended that the following claims be interpreted as covering all such alterations and modifications as fall within the true spirit and scope of the invention.

What is claimed is:

1. A modem system for transmitting and receiving signals comprising:
   a frequency domain equalizer (FEQ) being responsive to a plurality of received data symbols for processing the same to generate one or more equalized data symbols, said modem system being responsive to a plurality of received baseband signals for processing the same to generate said plurality of received data symbols, said plurality of received data symbols for including one or more sets of pilot tones, said FEQ for processing said sets of pilot tones to generate one or more sets of equalized pilot tones;

a frequency offset detection module being responsive to said sets of equalized pilot tones to generate one or more instantaneous carrier offsets, said modem system for processing said instantaneous carrier offsets to generate one or more frequency corrections for applying the same to said plurality of received baseband signals to remove carrier offsets therefrom;

a receiver circuit being responsive to a plurality of received signals for processing the same to generate said plurality of received baseband signals, said receiver circuit for including a plurality of antennae for receiving said plurality of received signals, said receiver circuit for decoupling said plurality of received data symbols;

a transmitter and a physical channel, said transmitter for sending signals to said physical channel for processing the same to generate a plurality of data symbols, said plurality of data symbols being transmitted to said receiver circuit;

a plurality of radio frequency (RF) modules being responsive to said plurality of received signals for processing the same to generate said plurality of received baseband signals, said modem system further including a phase lock loop (PLL) circuit for generating a common reference RF source for de-mixing said plurality of received signals;

a plurality of frequency shifters being responsive to said plurality of received baseband signals for processing the same to generate one or more adjusted signals, said plurality of frequency shifters for applying said frequency corrections to said plurality of received baseband signals to generate said adjusted signals;

one or more fast Fourier transform (FFT) analyzers being responsive to said adjusted signals for processing the same to generate said plurality of said received data symbols for including 64 frequency domain subcarriers; and being a one-input two-output (1T2R) modem system wherein said transmitter for sending one set of signals to said physical channel, said set of signals for including said set of pilot tones having an $i^{th}$ pilot tone, said physical channel for generating two data streams by multiplying said set of pilot tones with a channel vector being expressed as $$\begin{bmatrix} h_i^1 \\ h_i^2 \end{bmatrix};$$

wherein said plurality of received signals for including an $i^{th}$ pilot tone vector having tow components being expressed as $$\phi_i = \begin{bmatrix} h_i^1 \\ h_i^2 \end{bmatrix} \theta_i;$$

wherein said FEQ for utilizing estimated channel coefficients to generate said equalized data symbols, said estimated channel coefficients being expressed as $$\hat{H}^1 = \begin{bmatrix} \hat{h}_1 \\ \hat{h}_2 \\ \hat{h}_3 \\ \hat{h}_4 \end{bmatrix}^1, \hat{H}^2 = \begin{bmatrix} \hat{h}_1 \\ \hat{h}_2 \\ \hat{h}_3 \\ \hat{h}_4 \end{bmatrix}^2;$$

wherein said sets of equalized pilot tones for including an $i^{th}$ equalized pilot tone being generated using an $i^{th}$ optimal combiner being expressed as $$F_i = \frac{H_i^*}{|H_i^*|^2} = \frac{1}{\left(\left|\hat{h}_i^1\right|^2 + \left|\hat{h}_i^2\right|^2\right)}\begin{bmatrix} \hat{h}_i^{1*} & \hat{h}_i^{2*} \end{bmatrix};$$

and wherein the flexible architecture of said modem system allows for removal of said carrier offsets to improve reception of said plurality of received baseband signals.

2. A modem system for transmitting and receiving signals comprising:

a frequency domain equalizer (FEQ) being responsive to a plurality of received data symbols for processing the same to generate one or more equalized data symbols, said modem system being responsive to a plurality of received baseband signals for processing the same to generate said plurality of received data symbols, said plurality of received data symbols for including one or more sets of pilot tones, said FEQ for processing said sets of pilot tones to generate one or more sets of equalized pilot tones;

a frequency offset detection module being responsive to said sets of equalized pilot tones to generate one or more instantaneous carrier offsets, said modem system for processing said instantaneous carrier offsets to generate one or more frequency corrections for applying the same to said plurality of received baseband signals to remove carrier offsets therefrom;

a receiver circuit being responsive to a plurality of received signals for processing the same to generate said plurality of received baseband signals, said receiver circuit for including a plurality of antennae for receiving said plurality of received signals, said receiver circuit for decoupling said plurality of received data symbols;

a transmitter and a physical channel, said transmitter for sending signals to said physical channel for processing the same to generate a plurality of data symbols, said plurality of data symbols being transmitted to said receiver circuit;

a plurality of radio frequency (RF) modules being responsive to said plurality of received signals for processing the same to generate said plurality of received baseband signals, said modem system further including a phase lock loop (PLL) circuit for generating a common reference RF source for de-mixing said plurality of received signals;

a plurality of frequency shifters being responsive to said plurality of received baseband signals for processing the same to generate one or more adjusted signals, said plurality of frequency shifters for applying said frequency corrections to said plurality of received baseband signals to generate said adjusted signals;

one or more fast Fourier transform (FFT) analyzers being responsive to said adjusted signals for processing the same to generate said plurality of said received data symbols for including 64 frequency domain subcarriers; and being a two-input three-output (2T3R) modem system wherein said transmitter for sending two sets of signals to said physical channel, said signals for including said set of pilot tones, said set of pilot tones for including an $i^{th}$ pilot tone being represented by $$\Theta^i = \begin{bmatrix} \theta_1 \\ \theta_2 \end{bmatrix}^i,$$

said physical channel for generating three data streams using a channel matrix being expressed by $$H = \begin{bmatrix} h_{11} & h_{12} \\ h_{21} & h_{22} \\ h_{31} & h_{32} \end{bmatrix};$$

wherein said plurality of received signals for including an $i^{th}$ pilot tone vector having three components being expressed by $$\Phi^i = H\Theta^i = \begin{bmatrix} h_{11} & h_{12} \\ h_{21} & h_{22} \\ h_{31} & h_{32} \end{bmatrix} \begin{bmatrix} \theta_1 \\ \theta_2 \end{bmatrix}^i = \begin{bmatrix} h_{11}\theta_1 + h_{12}\theta_2 \\ h_{21}\theta_1 + h_{22}\theta_2 \\ h_{31}\theta_1 + h_{32}\theta_3 \end{bmatrix};$$

wherein said FEQ for determining the inverse of a distribution matrix by performing a QR decomposition, said set of equalized pilot tones for including an $i^{th}$ equalized pilot tone being determined according to $\hat{\Theta}^i = \hat{H}^{-1}\Phi^i = \hat{H}^{-1}H\Theta^i$; and wherein the flexible architecture of said modem system allows for removal of said carrier offsets to improve reception of said plurality of received baseband signals.

3. A modem system as recited in claim 1 wherein said frequency offset detection module for using said set of equalized pilot tones and a set of weights $\beta_i$ to generate said instantaneous carrier offset according to $$\hat{\Theta} = \sum_{i=1}^{4} \beta^i \hat{\Theta}^i,$$

said set of weights being computed using the summed magnitude quantities expressed as $(|\hat{h}_i^1|^2 + |\hat{h}_i^2|^2)$.

4. A modem system as recited in claim 2 wherein said frequency offset detection module for using said set of equalized pilot tones and a set of weights $\beta_i$ to generate said instantaneous carrier offset according to $$\hat{\Theta} = \sum_{i=1}^{4} \beta^i \hat{\Theta}^i,$$

said set of weights being computed using a scalar metric based on a matrix norm.

5. A modem system as recited in claim 4 further including an averaging (AVE) module being responsive to said two instantaneous carrier offsets for combining the same to generate an averaged carrier offset according to $$\hat{\theta} = \frac{1}{2}\sum_{i=1}^{2} \hat{\Theta}_i.$$

6. A modem system as recited in claim 5 further including a low pass filter/numerical oscillator (LPF/NCO) module being responsive to said averaged carrier offset for processing the same to generate said frequency correction.

7. A modem system as recited in claim 6 further including a feedforward module being responsive to said averaged carrier offset for processing said equalized data symbols to generate corrected symbols, said modem system further including a decoder being responsive to said corrected symbols for decoding the same.

8. A modem system for transmitting and receiving signals comprising:

a frequency domain equalizer (FEQ) being responsive to a plurality of received data symbols for processing the same to generate one or more equalized data symbols, said modem system being responsive to a plurality of received baseband signals for processing the same to generate said plurality of received data symbols, said plurality of received data symbols for including one or more sets of pilot tones, said FEQ for processing said sets of pilot tones to generate one or more sets of equalized pilot tones;

a frequency offset detection module being responsive to said sets of equalized pilot tones to generate one or more instantaneous carrier offsets, said modem system for processing said instantaneous carrier offsets to generate one or more frequency corrections for applying the same to said plurality of received baseband signals to remove carrier offsets therefrom;

a receiver circuit being responsive to a plurality of received signals for processing the same to generate said plurality of received baseband signals, said receiver circuit for including a plurality of antennae for receiving said plurality of received signals, said receiver circuit for decoupling said plurality of received data symbols;

a transmitter and a physical channel, said transmitter for sending signals to said physical channel for processing the same to generate a plurality of data symbols, said plurality of data symbols being transmitted to said receiver circuit; and being a two-input three-output (2T3R) modem including a plurality of phase lock loop/radio frequency (PLL/RF) modules, each of said plurality of PLL/RF modules for including an independent phase lock loop (PLL) circuit and a radio frequency (RF) circuit being responsive to a received signal for processing the same to generate one of said plurality of received baseband signals, said RF circuit being driven by said independent PLL circuit; and a plurality of frequency shifters being responsive to said plurality of received baseband signals for processing the same to generate one or more adjusted signals, said plurality of frequency shifters for applying said frequency corrections to said plurality of received baseband signals to generate said adjusted signals;

wherein the flexible architecture of said modem system allows for removal of said carrier offsets to improve reception of said plurality of received baseband signals.

9. A modem system for transmitting and receiving signals comprising:

a frequency domain equalizer (FEQ) being responsive to a plurality of received data symbols for processing the same to generate one or more equalized data symbols, said modem system being responsive to a plurality of received baseband signals for processing the same to generate said plurality of received data symbols, said plurality of received data symbols for including one or more sets of pilot tones, said FEQ for processing said sets of pilot tones to generate one or more sets of equalized pilot tones;

a frequency offset detection module being responsive to said sets of equalized pilot tones to generate one or more instantaneous carrier offsets, said modem system for processing said instantaneous carrier offsets to generate one or more frequency corrections for applying the same to said plurality of received baseband signals to remove carrier offsets therefrom;

a receiver circuit being responsive to a plurality of received signals for processing the same to generate said plurality of received baseband signals, said receiver circuit for including a plurality of antennae for receiving said plurality of received signals, said receiver circuit for decoupling said plurality of received data symbols;

a transmitter and a physical channel, said transmitter for sending signals to said physical channel for processing the same to generate a plurality of data symbols, said plurality of data symbols being transmitted to said receiver circuit; and being a two-input three-output (2T3R) modem including a plurality of phase lock loop/radio frequency (PLL/RF) modules, each of said plurality of PLL/RF modules for including an independent phase lock loop (PLL) circuit and a radio frequency (RF) circuit being responsive to a received signal for processing the same to generate one of said plurality of received baseband signals, said RF circuit being driven by said independent PLL circuit; and a plurality of frequency shifters being responsive to said plurality of received baseband signals for processing the same to generate one or more adjusted signals, said plurality of frequency shifters for applying said frequency corrections to said plurality of received baseband signals to generate said adjusted signals;

a feedback matrix module being responsive to said instantaneous carrier offsets for processing the same to generate one or more estimated carrier offsets, each of said estimated carrier offsets having three components, said set of pilot tones for including an $i^{th}$ pilot tone, said feedback matrix module for applying a distribution matrix to said instantaneous carrier offsets to generate said estimated carrier offset corresponding to said $i^{th}$ pilot tone according to $$\hat{\Phi}^i = \hat{H}^i \hat{\Theta}^i = \begin{bmatrix} \hat{h}_{11} & \hat{h}_{12} \\ \hat{h}_{21} & \hat{h}_{22} \\ \hat{h}_{31} & \hat{h}_{32} \end{bmatrix}^i \begin{bmatrix} \hat{\theta}_1 \\ \hat{\theta}_2 \end{bmatrix}^i = \begin{bmatrix} \hat{h}_{11}\hat{\theta}_1 + \hat{h}_{12}\hat{\theta}_2 \\ \hat{h}_{21}\hat{\theta}_1 + \hat{h}_{22}\hat{\theta}_2 \\ \hat{h}_{31}\hat{\theta}_1 + \hat{h}_{32}\hat{\theta}_3 \end{bmatrix}^i;$$

wherein said feedback matrix module for using carrier weights $\alpha^i$ for processing said estimated carrier offsets to generate a weighted carrier offset, said weighted carrier offset being determined according to $$\hat{\Phi} = \sum_{i=1}^{4} \alpha^i \hat{\Phi}^i;$$

and wherein the flexible architecture of said modem system allows for removal of said carrier offsets to improve reception of said plurality of received baseband signals.

* * * * *